(12) United States Patent
Burns

(10) Patent No.: US 11,578,516 B2
(45) Date of Patent: Feb. 14, 2023

(54) MULTIFUNCTION SECURING MECHANISM FOR DOOR

(71) Applicant: Hansen International, Inc., Lexington, SC (US)

(72) Inventor: Sean T. Burns, Lexington, SC (US)

(73) Assignee: Hansen International, Inc., Lexington, SC (US)

( * ) Notice: Subject to any disclaimer, the term of this patent is extended or adjusted under 35 U.S.C. 154(b) by 784 days.

(21) Appl. No.: 16/553,330

(22) Filed: Aug. 28, 2019

(65) Prior Publication Data

US 2020/0071974 A1 Mar. 5, 2020

Related U.S. Application Data

(60) Provisional application No. 62/725,425, filed on Aug. 31, 2018.

(51) Int. Cl.
*E05B 83/04* (2014.01)
*E05C 9/04* (2006.01)
(Continued)

(52) U.S. Cl.
CPC ............ *E05C 9/047* (2013.01); *E05B 13/002* (2013.01); *E05B 65/0021* (2013.01);
(Continued)

(58) Field of Classification Search
CPC .... E05C 9/047; E05B 13/002; E05B 65/0021; E05B 83/04; E06B 9/15; E06B 9/17046;
(Continued)

(56) References Cited

U.S. PATENT DOCUMENTS

| | | | | |
|---|---|---|---|---|
| 2,988,909 A | * | 6/1961 | Moler | E05B 65/0021 70/99 |
| 4,461,160 A | * | 7/1984 | Van Gompel | E05C 1/08 292/171 |

(Continued)

FOREIGN PATENT DOCUMENTS

| | | | | |
|---|---|---|---|---|
| DE | 29708703 U1 | * | 7/1997 | ........... E05B 63/185 |
| DE | 102017129427 B3 | * | 11/2018 | ............. E05B 63/22 |

(Continued)

OTHER PUBLICATIONS

Hansen International Product Catalog, 2008—3 pages.

*Primary Examiner* — Suzanne L Barrett
(74) *Attorney, Agent, or Firm* — JK Intellectual Property Law, PA

(57) ABSTRACT

A multifunction securing mechanism for a compartment closable by a door and includes a key cylinder, a latching assembly which may be a two-point latching assembly movable between a latching and an unlatching position, a rotatable member configured for a lazy-cam function connecting the key cylinder and latching assembly, at least one catch located on a surface adjacent the outside of the door, and a bar pivotally mounted to the outside of the door and movable between a first closed position and a second opened position. A first release mechanism is located on an interior side of the door for changing a positon of the latching assembly, and a second release mechanism is located on the interior side of the door for changing a position of the bar, both for allowing a user to open a latched and secured door from the inside.

15 Claims, 11 Drawing Sheets

(51) Int. Cl.
*E05B 65/00* (2006.01)
*E05B 13/00* (2006.01)
*E06B 9/15* (2006.01)
*E06B 9/80* (2006.01)
*E06B 9/17* (2006.01)
*B60J 5/14* (2006.01)
*B60J 5/08* (2006.01)

(52) U.S. Cl.
CPC ............... *E05B 83/04* (2013.01); *E06B 9/15* (2013.01); *E06B 9/17046* (2013.01); *E06B 9/80* (2013.01); *B60J 5/08* (2013.01); *B60J 5/14* (2013.01); *E05Y 2900/132* (2013.01); *E05Y 2900/531* (2013.01)

(58) Field of Classification Search
CPC ....... E06B 9/80; B60J 5/08; B60J 5/14; E05Y 2900/132; E05Y 2900/531
USPC ......................................................... 160/266
See application file for complete search history.

(56) References Cited

U.S. PATENT DOCUMENTS

| | | | |
|---|---|---|---|
| 4,480,863 A * | 11/1984 | Hormann | E05C 3/24 292/216 |
| D286,433 S | 10/1986 | Greco | |
| D288,131 S | 2/1987 | Magro | |
| D305,068 S | 12/1989 | Greco | |
| D323,714 S | 2/1992 | Greco | |
| D331,916 S | 12/1992 | DuBrucq | |
| 5,779,228 A | 7/1998 | Hansen | |
| 5,944,406 A | 8/1999 | Hansen | |
| 6,715,529 B2 | 4/2004 | Farooq | |
| 7,100,665 B2 | 9/2006 | Miller | |
| 7,114,753 B2 * | 10/2006 | Nodorft | E05B 65/0021 292/145 |
| D564,105 S | 3/2008 | Amato | |
| 7,510,224 B2 * | 3/2009 | Bacco | E05B 53/003 292/DIG. 32 |
| 7,866,368 B2 | 1/2011 | Ostrovsky et al. | |
| D647,213 S | 10/2011 | Seehof | |
| D647,630 S | 10/2011 | Seehof et al. | |
| D647,631 S | 10/2011 | Seehof | |
| D648,039 S | 11/2011 | Seehof | |
| 8,876,324 B2 | 11/2014 | Seehof | |
| 9,683,394 B1 * | 6/2017 | Rickrode | E05C 7/00 |
| 9,725,947 B2 * | 8/2017 | Seehof | B60J 5/08 |
| 2003/0110819 A1 * | 6/2003 | Sadler | E05B 13/004 70/210 |
| 2003/0111845 A1 * | 6/2003 | Sadler | E05C 9/043 292/336.3 |
| 2008/0216527 A1 * | 9/2008 | Burns | E05B 5/00 70/145 |
| 2014/0318718 A1 * | 10/2014 | Seehof | B60Q 1/2669 160/127 |
| 2015/0135782 A1 * | 5/2015 | Sadler | E05C 3/30 70/344 |
| 2017/0081886 A1 * | 3/2017 | Stephens | E05B 77/30 |

FOREIGN PATENT DOCUMENTS

| | | | | |
|---|---|---|---|---|
| DE | 102018132665 A1 * | 6/2020 | ........... | E05C 17/003 |
| GB | 2084643 A * | 4/1982 | ........... | E05B 13/10 |
| KR | 20070099557 A * | 10/2007 | ........... | E06B 9/17 |

* cited by examiner

MULTIFUNCTION SECURING MECHANISM FOR DOOR

CROSS-REFERENCE TO RELATED APPLICATIONS

This application claims filing benefit of U.S. Provisional Patent Application Ser. No. 62/725,425 with a filing date of Aug. 31, 2018, which is incorporated herein by reference in its entirety.

TECHNICAL FIELD

The present disclosure relates to a mechanism for a door. More particularly, the present disclosure relates to such a door with a locking mechanism lockable via an external key cylinder and unlockable via an internal release, allowing the door to be opened from the inside when the key cylinder is in a locked position.

BACKGROUND

Vehicle boxes and compartments with doors, lids or the like have lockable latching assemblies to allow them to be opened and secured in a closed position. The latching assemblies include a latch device such as a pin, rod, or slider movable between a latching position and an open position. In the latching position, the latch is placed in a catch, an opening in a track, or behind an interfering structure of some sort to prevent the door from being opened. In the opened positon, the latch is retracted so as to not contact the corresponding structure and thereby allow the door to be opened. By turning the key in the key cylinder, a mechanism attached to the cylinder transfers rotational motion to generally more linear motion to move the latch back and forth. Roll up doors often have an additional external handle mechanism in which a bar is pivotally held beneath catches at lateral edges of the door to keep the door closed apart from locking the door.

However, if a person is accidentally locked in the compartment, or if the person wishes to be locked in the compartment during working (for example, for security reasons), re-opening a locked door from the inside is impossible without the key. Also, pivoting the external bar outward from the catches is also required. Such issues provides challenges for users of doors and roll up doors in particular.

While currently available lockable assemblies generally function well for their intended purposes, a door locking mechanism addressing one or more of the above issues, and/or providing other benefits, would be welcome.

SUMMARY

According to certain aspects of the disclosure, a multifunction securing mechanism is disclosed for a compartment closable by a door movable by a user between an opened position and a closed position. The multifunction securing mechanism may include, for example, a latching assembly including a rotatable member and latch connected to the rotatable member and movable between a latching position and an unlatching position, when the door is in the closed position and the latch is in the latching position the latch is positioned to secure the door in the closed position, and when the door is in the closed position and the latch is in the unlatching position the latch is positioned to allow the door to move from the closed position toward the opened position. A key cylinder may have a key opening on an outside of the door, the key cylinder selectively rotatable in a first direction and a second direction, the rotatable member of the latching assembly movable via rotation of the key cylinder in the first direction to move the latch from the unlatching position to the latching position, the rotatable member of the latching assembly movable via rotation of the key cylinder in the second direction to move the latch from the latching position to the unlatching position. At least one catch may be located on a surface adjacent the outside of the door. A bar may be pivotally mounted to the outside of the door and movable between a first position and a second position, when the door is in a closed position and the bar is in the first position the catch contacts the bar and prevents the door from moving toward the opened position, and when the door is in a closed position and the bar is in the second position the catch is spaced from the bar and allows the door to move toward the opened position. A first release mechanism may be located on an interior side of the door, the first release mechanism including a release element operatively attached to the rotatable member of the latching assembly and movable between a rest position and a release position, movement of the release element from the rest position to the release position moving the latch from the latching position to the unlatching position. A second release mechanism may be located on the interior side of the door, the second release mechanism including a release element attached to the bar for moving the bar from the first position to the second positon. Various options and modifications are possible.

For example, the first release element may include an extending element attached to the rotatable member of the latching assembly, and the rotatable element of the latching assembly may include a plate, a first end of the latch being pivotally attached to the plate, the rotatable element defining an opening with a camming profile for selectively rotating with the key cylinder when the plate rotates. The device may further include a cover with at least one arcuate guide slot adjacent the rotatable element, the arcuate guide slot directing and defining a rotational extent of movement of the extending element, and the rotatable assembly may include two of the extending elements and two of the arcuate guide slots, the two extending elements being located on opposite sides of the key cylinder.

The second release mechanism may include a handle and at least one connecting member extending through the door, the connecting member being fixed to the bar and the handle so that the bar, connecting member and handle move together as one rigid unit. The second release mechanism may also include two of the connecting members and the handle includes a second bar.

The device may include two of the catches, each of the catches being mounted at a respective lateral side of a roll up door. The door may be a roll up door mounted in two tracks at lateral sides of the roll up door. The latch may extend into an opening in one of the tracks when the door is in a closed position and the latch is in the latching position, and the latching assembly may include two of the latches, each of the latches extendable into an opening in a respective one of the tracks when the door is in a closed position and the latches are in the latching position. The latches may be mounted on rods, each rod being pivotally attached to a flange rotatable with the key cylinder.

According to certain other aspects of the disclosure, a roll up door assembly is disclosed that is mountable in two laterally-spaced tracks, the roll up door assembly including, for example, a door sized to be mountable and slidable along the two, laterally-spaced tracks, the door being a roll up door; a latching assembly including a rotatable member and latch connected to the rotatable member and movable between a latching position and an unlatching position, when the door is in the closed position and the latch is in the latching position the latch is positioned to secure the door in the closed position, and when the door is in the closed position and the latch is in the unlatching position the latch is positioned to allow the door to move from the closed position toward the opened position; a key cylinder having a key opening on an outside of the door, the key cylinder selectively rotatable in a first direction and a second direction, the rotatable member of the latching assembly movable via rotation of the key cylinder in the first direction to move the latch from the unlatching position to the latching position, the rotatable member of the latching assembly movable via rotation of the key cylinder in the second direction to move the latch from the latching position to the unlatching position; at least one catch located on a surface adjacent the outside of the door; a bar pivotally mounted to the outside of the door and movable between a first position and a second position, when the door is in a closed position and the bar is in the first position the catch contacts the bar and prevents the door from moving toward the opened position, and when the door is in a closed position and the bar is in the second position the catch is spaced from the bar and allows the door to move toward the opened position; a first release mechanism located on an interior side of the door, the first release mechanism including a release element operatively attached to the rotatable member of the latching assembly and movable between a rest position and a release position, movement of the release element from the rest position to the release position moving the latch from the latching position to the unlatching position; and a second release mechanism located on the interior side of the door, the second release mechanism including a release element attached to the bar for moving the bar from the first position to the second positon. Again, various options and modifications are possible.

For example, the first release element may include an extending element attached to the rotatable member of the latching assembly, and the rotatable member of the latching assembly may include a plate, a first end of the latch being pivotally attached to the plate, the rotatable member defining an opening with a camming profile for selectively rotating with the key cylinder when the plate rotates. The second release mechanism may include a handle and at least one connecting member extending through the door, the connecting member being fixed to the bar and the handle so that the bar, connecting member and handle move together as one rigid unit.

The device may include two of the catches, each of the catches being mounted at a respective lateral side of a roll up door, and the latching assembly includes two of the latches, each of the latches extendable into an opening in a respective one of the tracks when the door is in a closed position and the latches are in the latching position.

The latches are mounted on or do themselves comprise rods or portions of rods, each rod being pivotally attached to the rotatable member.

According to certain other aspects of the disclosure, a multifunction securing mechanism is disclosed for a compartment closable by a door movable by a user between an opened position and a closed position, the multifunction securing mechanism including, for example, a key cylinder having a radially extending drive member attached thereto; a two-point latching assembly including a rotatable member drivable via the drive member during rotation of the key cylinder, the two-point latching assembly including two latches each having a first end attached to the rotatable member and a second end movable between a latching position and an unlatching position, when the door is in the closed position and the latches are in the latching position the latches are positioned to secure the door in the closed position, and when the door is in the closed position and the latches are in the unlatching position the latches are positioned to allow the door to move from the closed position toward the opened position; an opening in a structure rotatable with the rotatable member defining a lazy cam profile interacting with the drive member; at least one catch located on a surface adjacent the outside of the door; a bar pivotally mounted to the outside of the door and movable between a first position and a second position, when the door is in a closed position and the bar is in the first position the catch contacts the bar and prevents the door from moving toward the opened position, and when the door is in a closed position and the bar is in the second position the catch is spaced from the bar and allows the door to move toward the opened position; a first release mechanism located on an interior side of the door, the first release mechanism including a release element operatively attached to the rotatable member for moving the latches between the latching position and the unlatching position without use of the key cylinder; and a second release mechanism located on the interior side of the door, the second release mechanism including a release element attached to the bar for moving the bar from the first position to the second positon. As above, various options and modifications are possible.

For example, the first release element may include an extending element attached to the rotatable member of the latching assembly, and the second release mechanism may include a handle and at least one connecting member extending through the door, the connecting member being fixed to the bar and the handle so that the bar, connecting member and handle move together as one rigid unit.

BRIEF DESCRIPTION OF THE DRAWINGS

More details of the present disclosure are set forth in the drawings.

DETAILED DESCRIPTION

Figure 1:
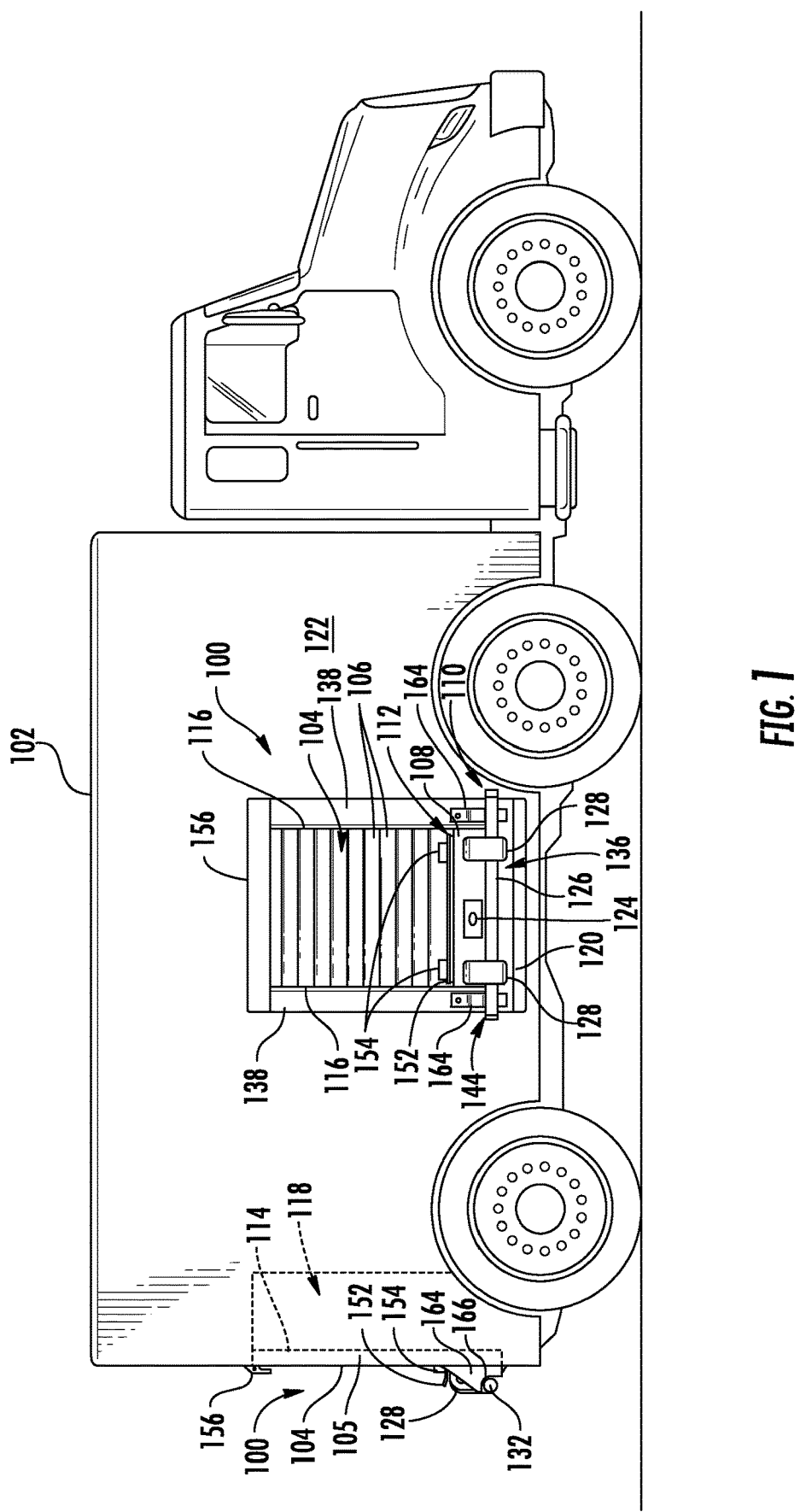
FIG. 1 is a side view of a vehicle showing locations of doors and certain aspects of the multifunction securing mechanism according to the present disclosure.

Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment. Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

As illustrated in FIG. 1, two roll up door assemblies 100 are mounted to an exemplary schematic vehicle 102, which could be a fire, rescue, commercial or other type of vehicle.

Each door assembly 100 includes a door 104 having a plurality of joined slats 106 for closing an opening 105. Bottom slat 108 is generally larger and may include handles 110 and/or 112, as discussed below. Slats 106 ride in tracks 114 which are part of door frame 138. Sealing members 116 may be provided on sides of door assembly 100 to keep dirt and moisture out of tracks 114 and the compartment 118 covered by door assembly 100. The bottom of door opening 105 may include a sill 120, which may be flush with outer walls 122 of vehicle 102 (as shown). A multifunction securing mechanism 136 includes various elements for latching, locking, securing, releasing, etc. door 104 and related components.

Handle 110 may be a pivotal handle assembly 144 including a member 126 pivotally mounted to slat 108 via pivot blocks 128. Axles 130 through blocks 128 are attached to slat 108 via mounts 129 to allow the pivoting. Member 126 may be an extrusion such as a bar 132. Bar 132 may have a cavity (not shown) at least in part of its length, for example between blocks 128, to receive a lighting element (not shown), which could be a strip light including one or more lighting members such as incandescent, fluorescent, or LED's. The lighting element may cast light as desired downward, toward the vehicle outer wall 122 for lighting the compartment 118 (when door 104 is opened) or for lighting by reflection 134 an area adjacent vehicle 100 (when door 104 is closed). End caps may cover ends of the bar so as to protect the lighting element in the cavity.

Figure 2:
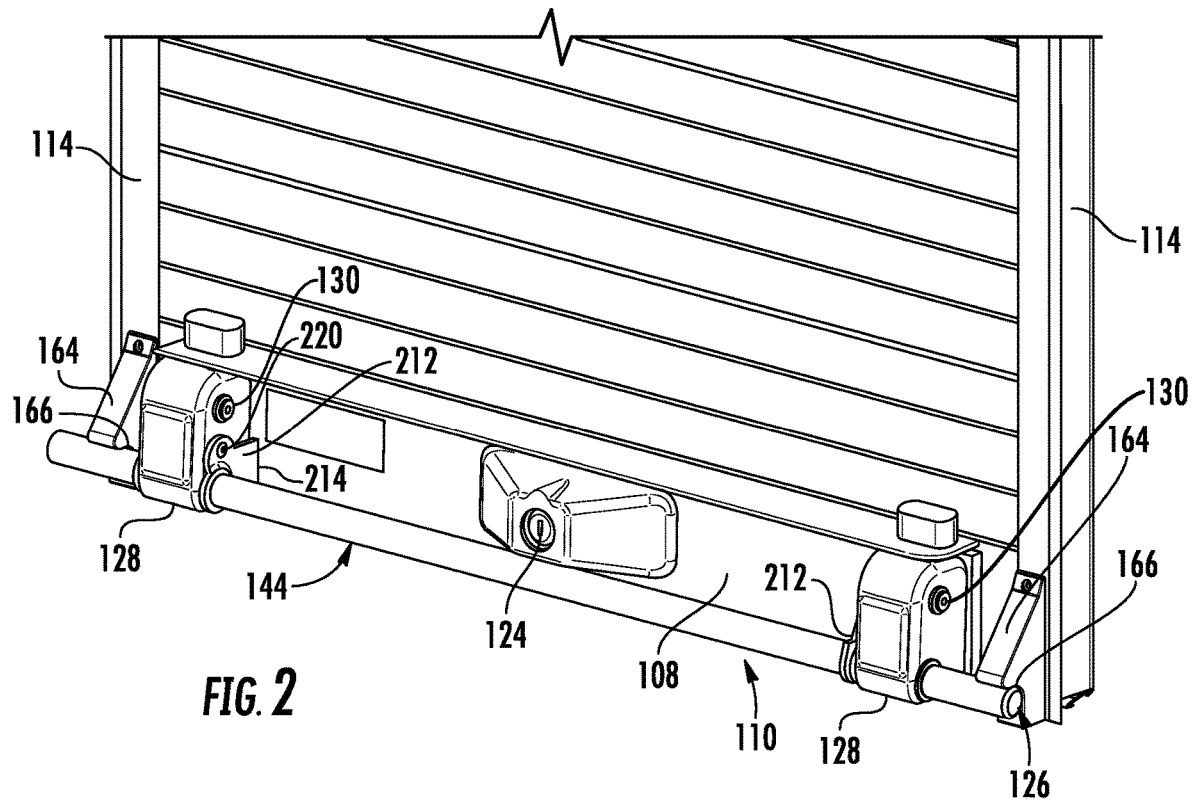
FIG. 2 is an isometric close-up view of the outer bottom portion of a door, frame, and wall as in FIG. 1 with the pivotable handle assembly in a first, secured (retracted) orientation.
Figure 3:
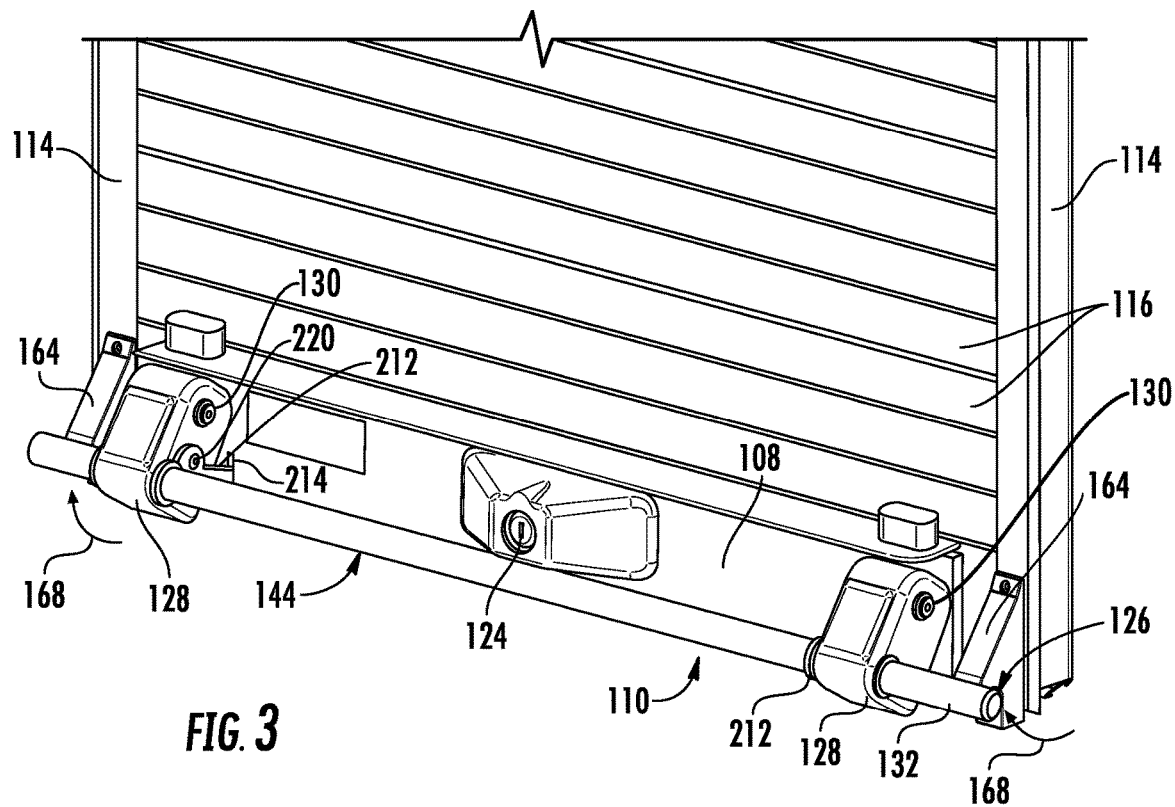
FIG. 3 is an isometric close-up view as in FIG. 2, with the pivotable handle assembly in a second, unsecured (pivoted) orientation.

Retaining elements 164 may be mounted to frame 138 or outer walls 122, each retaining element having a cavity 166 shaped for releasably securing bar 132 with a friction fit to maintain door 104 in a closed position. FIGS. 1 and 2 show handle 110 in a secured (retracted) position. FIG. 3 shows handle 110 in an unsecured (pivoted) position where bar 132 and pivot blocks 128 have been pivoted outward and upward around axles 130 (see arrows 168 in FIG. 2) so that bar 132 is clear of cavities 166 of retaining elements 164 and door 104 can thus be raised by pulling upward on bar 132.

Handle 112 is a fixed element. It can be extruded as part of slat 106 or the bottom slat 108, or may be attached to either. As shown, handle 112 includes a plate-like member 152 attached to a top of bottom slat 108. Bumpers 154, which may be flexible rubber, plastic or the like, may be provided for contacting a top sill 156.

FIGS. 4-15 show other details of the multifunction securing mechanism 136 mounted so as to selectively secure compartment 118 with door 104 attached to frame 138 surrounding opening 105. It should be understood that, as used herein and in claims below, "door" means any movable closure member, including but not limited to a horizontally or vertically hinged door, a slidable door, a rollup door, etc. Door 104 could also mean a lid or cover of a compartment, tool box, etc. Compartment 118 may be a portion of a vehicle such as an internal or external tool compartment, a passenger compartment, a trunk area, etc. formed as part of or integral with a vehicle body. Compartment 118 may also be an element that may be added to a vehicle such as a job box attached to a vehicle body. Compartment 118 may also be a standalone compartment of a building or other (non-vehicular) structure, such as a shed, walk-in cooler, or any other door of a structure. Frame 138 may thus include portions of an internal or external body of a vehicle, a portion of a storage box, a portion of a building or structure, etc. Opening 105 is the area selectively closable by moving door 104 between a closed position and an opened position to allow access to interior of compartment 118. It should thus be understood that the disclosure and claiming of a door, frame, opening, and compartment herein are to be broadly interpreted and not limited to the examples shown.

Generally speaking, the disclosure below includes portions directed to a latching assembly 140, key cylinder assembly 142, the pivotal handle assembly 110, a first release mechanism 146, and a second release mechanism 148. Each of these elements includes parts that are selectively movable between positions to help determine the status of door 104. That is, the status of door 104 may be such that the door may be opened or closed, latched or unlatched, locked or unlocked, secured or unsecured, and may (or may not) be movable from the closed position to the opened position. All of elements 140-148 are not needed in all aspects of the disclosed inventions; some aspects of the disclosed inventions include fewer than all of elements 110 and 140-148. Some elements described below due to their interrelationship of structure and function may comprise parts of more than one of elements 110 and 140-148. The appended claims and permissible equivalents indicate the scope of the invention protected herein.

Figure 4:
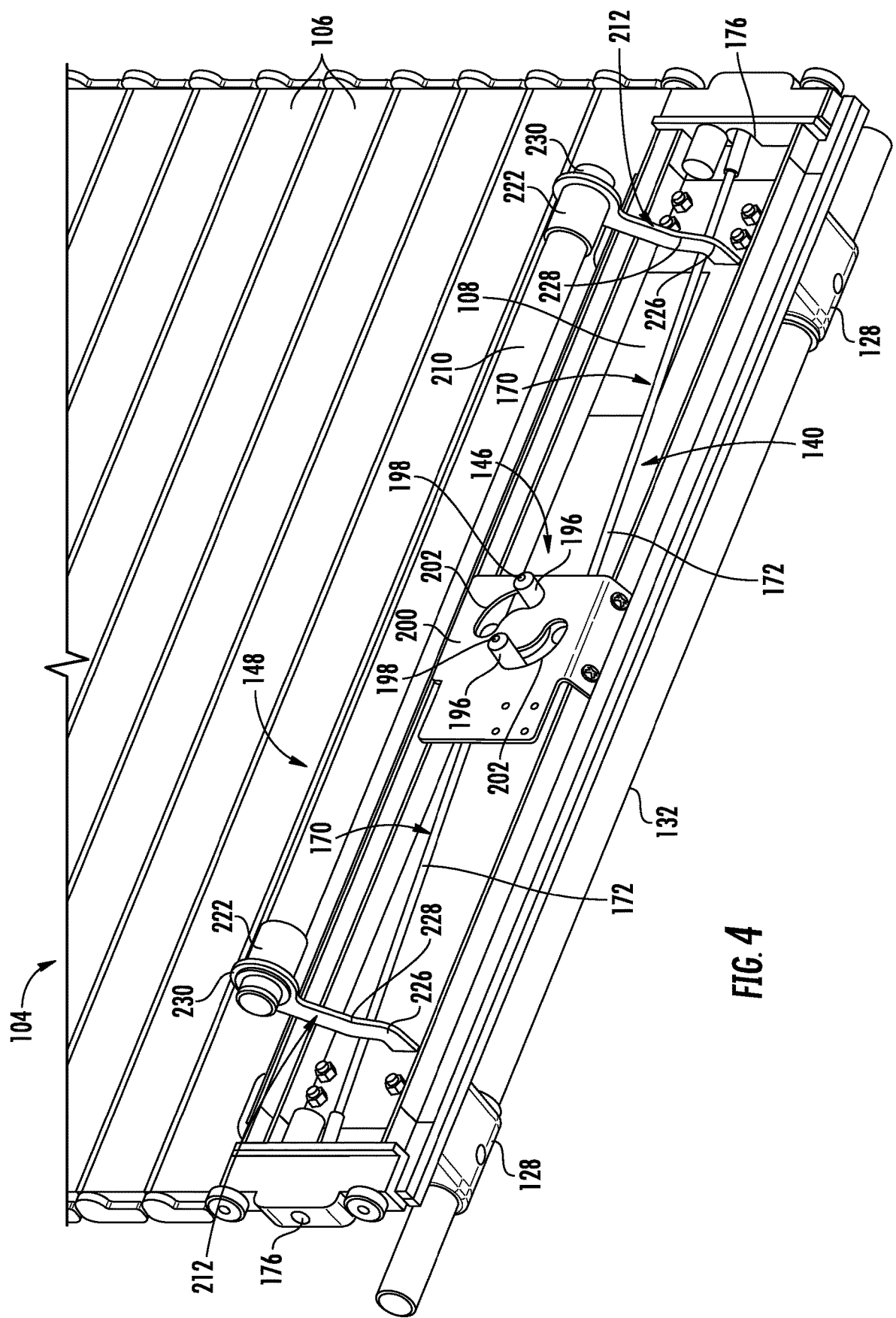
FIG. 4 is an isometric close-up view of the inner bottom portion of a door as in FIG. 1 without the frame.

FIG. 4 shows a substantial portion of elements 140-148 from an interior side of door 104 and removed from tracks 114 for clarity and with a cover over top of portions of latching assembly 148 also not shown for clarity. The operation of each of elements 140-148 will be discussed below individually and interactively.

Figure 7:
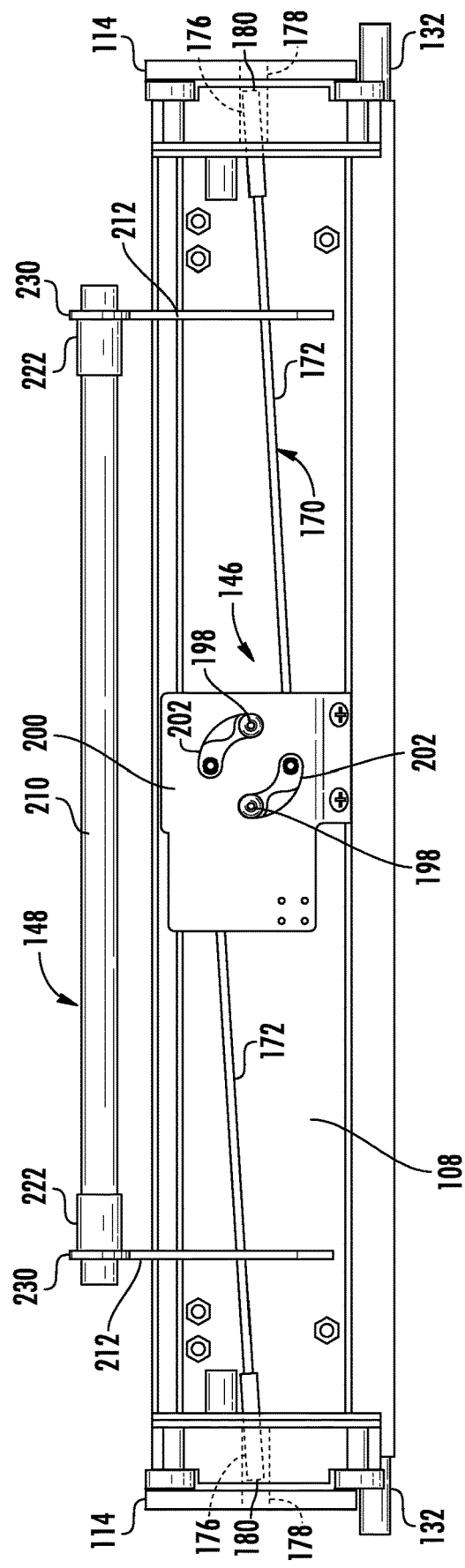
FIG. 7 is a rear view of a bottom portion of the door showing the latching assembly with the latch in an unlatched position.
Figure 8:
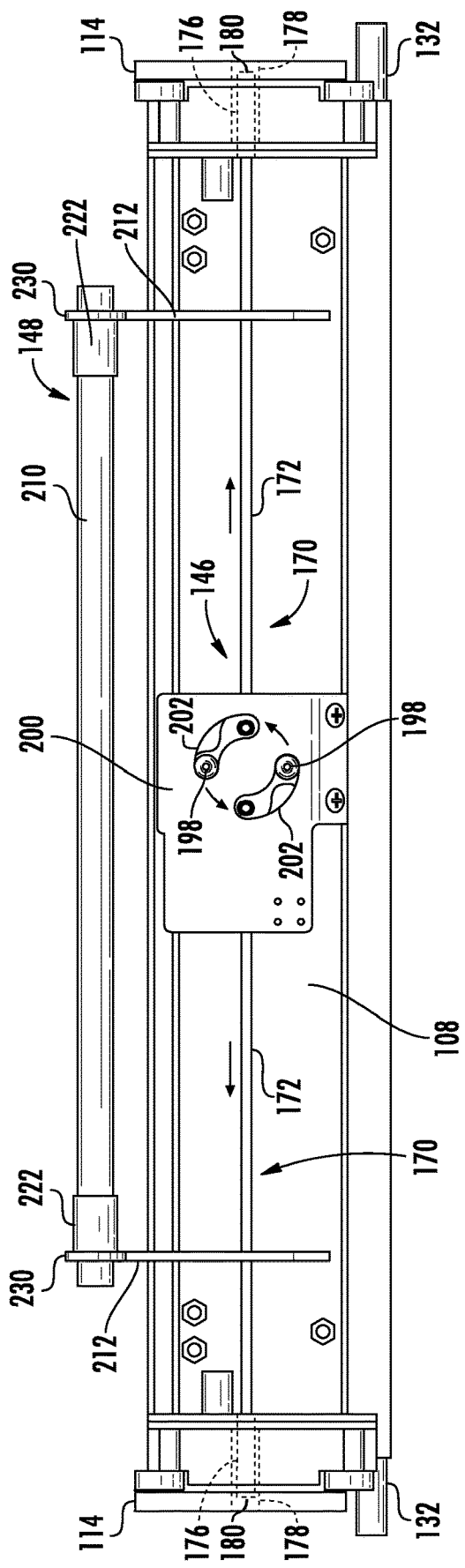
FIG. 8 is a rear view as in FIG. 7, but with the latch in a latched position.

As shown in FIGS. 4, 7, and 8, latching assembly 140 is located on an inside of door 104. Latching assembly may be operated via key cylinder 142 (from the outside of door 104) and via first release mechanism 146 (from the inside of the door 104). As illustrated, latching assembly 140 includes a two-point latching configuration with a latch 170 located on both lateral sides of door 104, but it would be possible to employ a one-point latch configuration with only one latch 170 if desired. Each latch 170 is connected via a rod 172 to a rotatable element, including a flange or plate 174 mounted on bottom slat 108. Rotatable element/flange 174 of latching assembly 140 as illustrated is mounted to bottom slat 108, but it could be mounted elsewhere (upwards) along door 104 if desired. The rotatable element is rotatable relative to key cylinder 142, within certain limits as will be described below. Rods 172 may incorporate a bend and may extend through flange 174 to be retained by a clip 173, or may include another mechanism allowing rotational connection to flange.

Latch 170 may be a reinforced bar, a thickened portion of rod, a square or hex or other shaped element, whether uniformly formed or attached to rod. Alternatively, latch 170 may simply be an end portion of rod 172 without substantial difference in cross-sectional shape or thickness. Also, latch 170 may be movable relative to rod 172 (such as a pivotable, slidable, etc.), and may be spring biased toward an extended or retracted position, to then be moved via rod 172 and/or an intervening mechanism (not shown).

As illustrated, in the position of FIG. 7, latches 170 are retracted sufficiently into openings 176 in bottom slat 108 so that door 104 may slide up and down within tracks 114 unimpeded by latches 170. Rotation of flange 174 (to the position of FIG. 8 causes latches 170 to extend from openings 176. If door is in the closed position and flange 174 is so rotated, latches 170 will extend into openings 178 in tracks 114 aligned with openings 176 in bottom slat 108. In such position, latches 170 are in the latching position and door 104 is secured in the closed position. If latches 170 are retracted as in FIG. 7, the latches are in an unlatching position, and door 104 is not secured by the latches because the latches are retracted back from openings 178 in tracks 114, thereby permitting the door to freely move up or down in the tracks.

Springs may be provided, such as coil spring 182 between slat 108 and flange 174, to bias the flange in a rotational direction that biases latches 170 to the latched position of FIG. 8, or the unlatched positon of FIG. 7, or (as shown) a toggle spring that biases toward the closer of those positions from any central location during rotation of flange 174. Coil spring 182 may be replaced by coil, compression, or tension springs (not shown) along rods 172 or at latches 170 to bias the latches in either desired direction.

Ends 180 of each latch 170 may be curved, pointed, slanted, conical, etc. (as opposed to flat) to assist in guiding the latch into the respective opening 178 in track 114 when latching assembly 140 is being moved to the latching position. Openings 176 and 178 may be modified if the latch and rod are modified as noted above so as to achieve a corresponding latching and unlatching arrangement upon operation of latching assembly 140. Openings 178 may be replaced by another fixed structure, such as a shoulder, flange, plate, rod, etc. attached to or extending from tracks 114 or walls 122 for contacting latch 170 and preventing movement of door upward when latched. Further, openings 178 could be replaced by movable structures, such as electronic (e.g., servo-controlled) locking mechanisms, or other movable locking mechanisms for selectively locating a structure in a position such that it contacts and prevents latch 170 from moving past the structure and therefore maintains the door in a closed position.

Latching assembly 140 may be moved between the position of FIG. 7 and the position of FIG. 8 via use of key cylinder 142 (from outside of door 104) or via use of first release mechanism 146 (from inside of door 104). Key cylinder 142 may drive flange 174 via one of several possible lost-motion actions (i.e., via what is commonly called a "lazy cam") or a fixed drive (with no lost motion). Accordingly, in some ways, flange 174 is like a bolt driven by key cylinder 142, with the bolt being attached to one or more latches 170 via rods 172.

According to certain aspects of the disclosure, use of a lazy cam type key cylinder 124 allows for certain benefits with relation to the first release mechanism 146, in particular allowing the first release mechanism to also provide a locking function from inside of door 104 without use of a key in the key cylinder outside of the door. However, use of a lazy cam, lost-motion type key cylinder is not required in all aspects of the disclosure.

As shown in FIG. 9-15, two cams 184 extend radially outward from key cylinder 142. If desired, only one such cam, or more than two such cams, may be used. Cams 184 are attached to key cylinder 142 so as to rotate therewith, when the key cylinder 142 is rotated by insertion of a key (not shown).

As illustrated, key cylinder 142 is limited to a 90 degree motion. Thus, to operate the key cylinder 142 and operate the latch (for example, to move the latch from an unlatching, retracted position to a latching, extended position), the key is turned 90 degrees in a first direction. They key must be returned to the original position (rotated 90 degrees in a second, reverse direction) to remove it from key cylinder 142. Doing so does not cause the latch to move, due to the lazy cam feature, described below. To move the latch from the latching, extended position to the unlatched, retracted position, the user would insert the key and turn it and key cylinder 142 90 degrees in the second direction. The user would then turn the key and key cylinder 142 90 degrees in the second direction to remove the key (without moving the latches. Such key cylinders of many designs are available from many suppliers and further detail need not be given here for purposes of this disclosure.

To provide a lazy cam function, the rotatable element/ flange 174 of the latching assembly may define an opening 186 with a camming profile for selectively rotating with key cylinder 142. Opening 186 defines paired first and second shoulders (188 and 192; 190 and 194). As shown, each pair of circumferential shoulders is spaced apart by an amount that provides a 90 degree rotation of cams 186, taking into account the circumferential width of the cams. However, if something other than a 90 degree key turn were desired, other spacings or numbers of cams and shoulders could be provided.

First release mechanism 146 is located on an interior side of door 104 (see FIGS. 4 and 8) and includes at least one release element 196 operatively attached to rotatable member/flange 174 of latching assembly 140 and movable between a rest position and a release position. As shown, release element 196 incorporates two extending elements such as pins 198 mounted for rotation with rotatable element/flange 174. If desired, pins 198 may be connected to a further gripping element, handle, etc. (not shown) for use by someone inside door 104.

Movement of release element 196/pins 198 from the release position (FIG. 7) to the rest position (FIG. 8) moves latches 170 from the unlatched positon to the latched position. Movement of release element 196/pins 198 from the rest position (FIG. 8) to the release position (FIG. 7) moves latches from the latching position to the unlatching position. Such 90 degree rotation (either way) is possible due to the configuration of the cams 184, opening 186, lazy-cam function in general etc., without requiring use of a key in key cylinder 142. If desired, a cover 200 with at least one arcuate guide slot 202 may be provided adjacent the rotatable element, with the arcuate guide slots sized so as to direct and define a desired rotational extent of movement (e.g., 90 degrees) of pins 198. Cover 200 and slots 202 thus help to guide the user in rotating rotatable element/flange 174 a desired direction, in a sufficient amount, and without damaging other elements of the assembly by inadvertently turning too far or by applying too much force.

Figure 9:
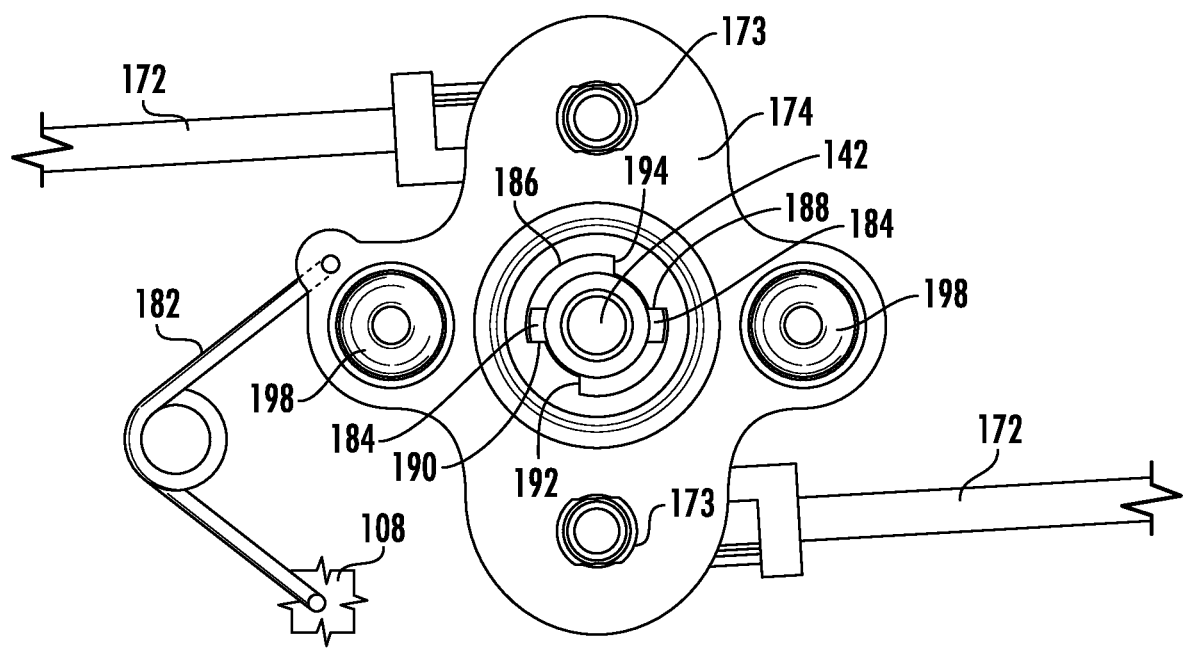
FIG. 9 is a rear, close-up view of a portion of the latching assembly showing the latching assembly with the latch in an unlatched position before a key is inserted into the key cylinder.

Operation of latching assembly 140, key cylinder 142, and first release mechanism 146 are illustrated in FIGS. 9-13, showing an inside of door view of such elements. In FIG. 9, door 104 is assumed to be rolled down and latches 170 are in the unlatching, retracted position. In short, door 104 is closed but unlocked. Cams 184 on key cylinder 142 extend substantially horizontally.

Figure 10:
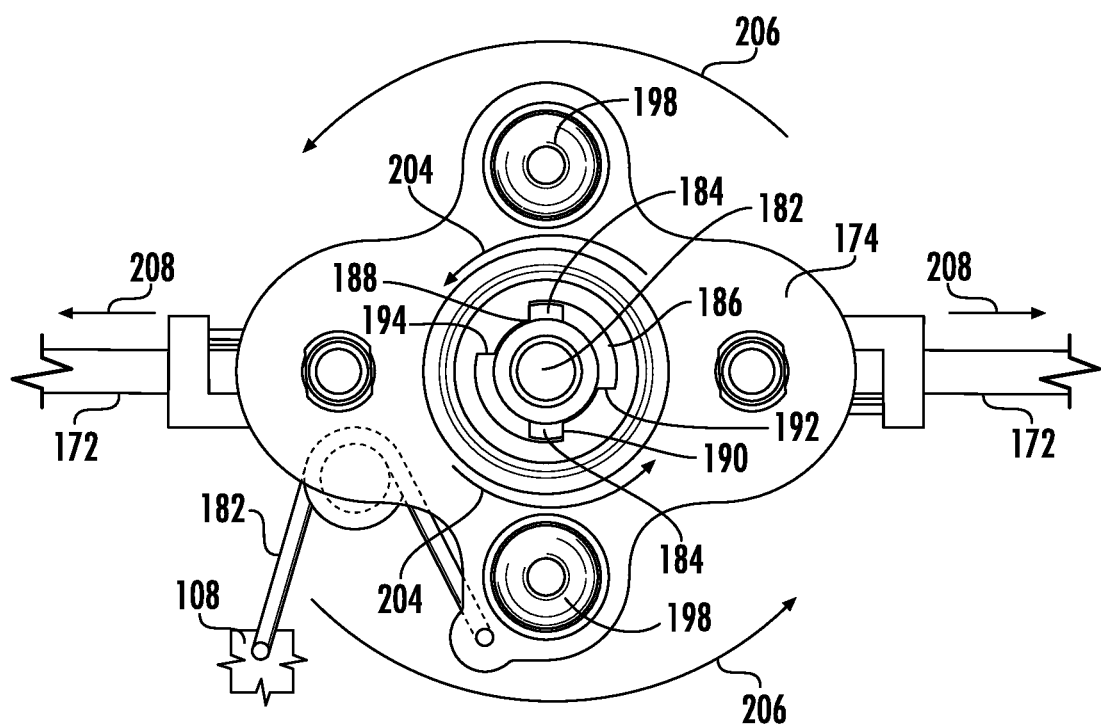
FIG. 10 is a rear, close-up view as in FIG. 9, but with the key inserted in the key cylinder and turned in the first direction and with the latch of the latching assembly correspondingly moved to the latched position.

FIG. 10 shows orientation after a key has been placed in key cylinder 142 and rotated 90 degrees (counterclockwise as illustrated, clockwise from the perspective of the user of the key). Arrows 204 indicate direction of rotation of key cylinder and cams 184; arrows 206 indicate direction of rotation of rotatable element/flange 174; and arrows 208 indicate general direction of movement (translation with some rotation) of latches 170 and rods 172. As shown, rotation of key cylinder 142 (arrows 204) causes cams 184 to contact first shoulders 188, 190 to rotate rotatable element 174 (arrows 206) to thereby move and extend rods 172 and latches 170 into the latching position (arrows 208). In short, door 204 is closed and locked (by latches 170), but the key is still in key cylinder 142.

Figure 11:
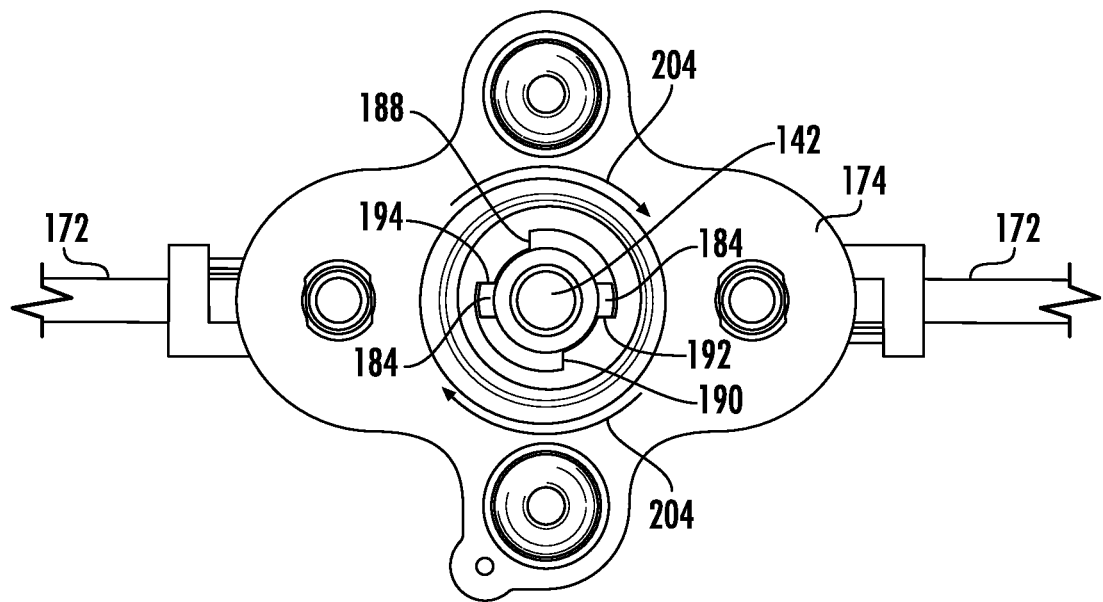
FIG. 11 is a rear, close-up view as in FIG. 10, but with the key removed from the key cylinder after having been turned in the second direction leaving the latch of the latching assembly in the latched position.

FIG. 11 shows orientation after key cylinder 142 has been rotated back 90 degrees (arrows 204) via the key, so that the key can be removed. Note that only key cylinder 142 and cams 184 rotate because the size and orientation of opening 186 allows for the lost-motion, lazy cam function. Cams 184 are moved to point of contact with, but not far enough to move, second shoulders 192, 194. Flange 174, rods 172, and latches 170 therefore do not move. The door remains closed and locked, and the key can be removed.

Figure 12:
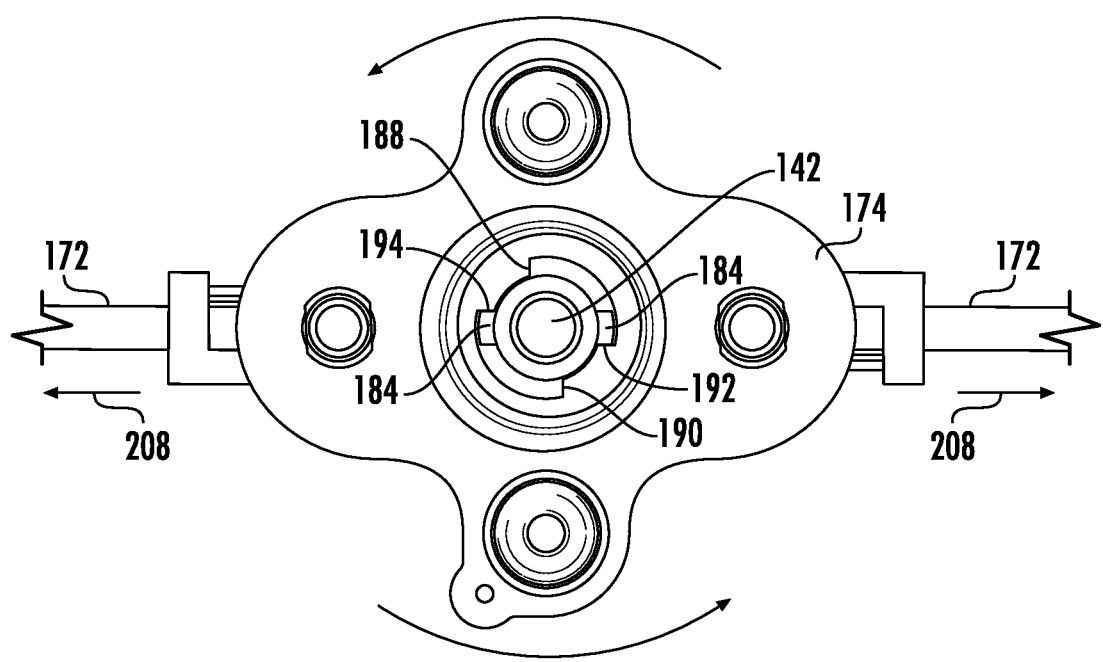
FIG. 12 is a rear, close-up view as in FIG. 9, after having been turned in the second direction via the first release mechanism moving the latch of the latching assembly to the latched position.

FIG. 12 shows an alternate manner of locking (latching) door 104 from the inside (starting in the closed unlatched position of FIG. 9), and using first release mechanism 146 instead of the key. By grasping pins 198 (or any grasping member or handle, not shown, attached thereto) and rotating it and flange 174 90 degrees counterclockwise from the position of FIG. 9 to that of FIG. 12 (arrows 206), rods 172 and latches 170 are moved to the latching position (arrows 208). Key cylinder 142 and cams 184 do not rotate, as the size and orientation of opening 186 permits such movement. First shoulders 188, 190 rotate move away from, and second shoulders 192, 194 are moved to point of contact with, cams 184 which remain stationary. Such configuration allows latches 170 to be moved to the latched position, from the inside, without use of the key. As in FIG. 11, the door is closed and locked and no key is in the key cylinder 142. Thus, a user can pass through the door, and then close and lock the door from the inside using first release mechanism 146, all without using the key.

Figure 13:
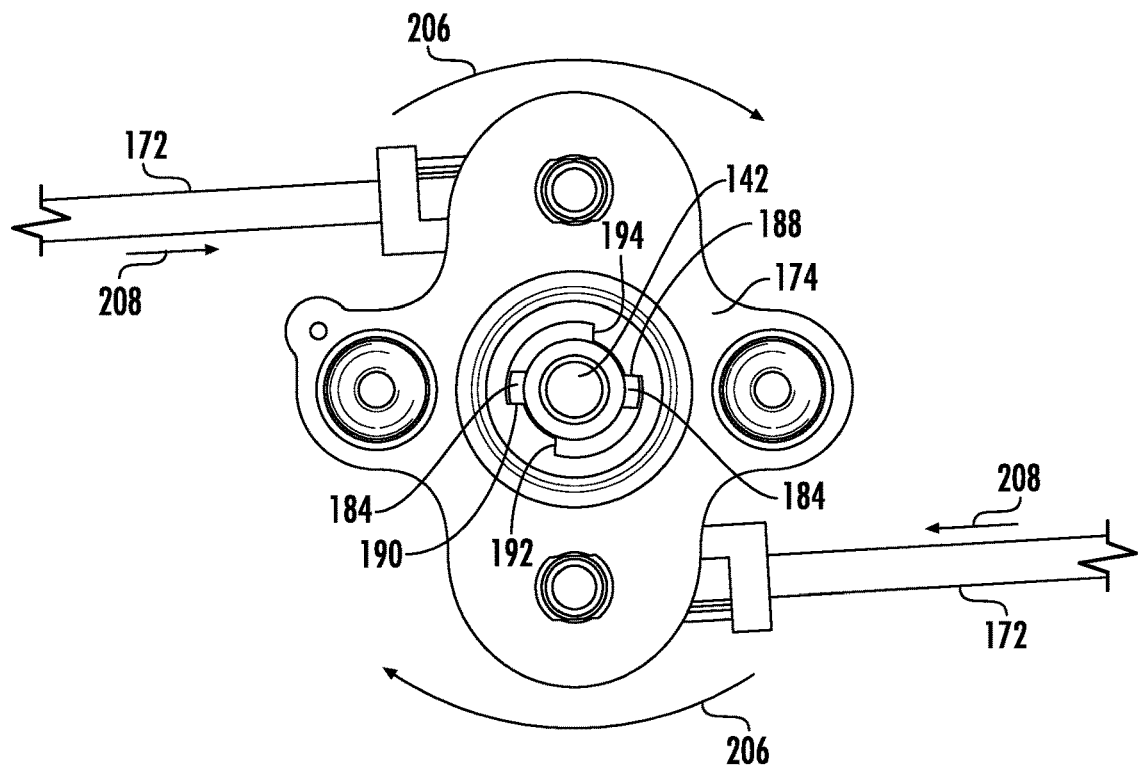
FIG. 13 is a rear, close-up view as in FIG. 11, but with the latch of the latching assembly moved to the unlatched position by moving the first release mechanism from the rest position to the release position.

FIG. 13 shows the return of latches 170 to the unlatching position using first release mechanism 146, starting at the latched position, regardless if reached as in FIG. 11 (key) or FIG. 12 (first release mechanism). The user rotates first release mechanism clockwise (arrows 206). Key cylinder 142 and cams 184 do not rotate, as the size and orientation of opening 186 permits such movement. Second shoulders 192, 194 rotate move away from, and first shoulders 188, 190 are moved to point of contact with, cams 184 which remain stationary. The orientation of parts in FIG. 13 has thus returned to the original position of FIG. 9.

Thus, the user can use first release mechanism 146 to unlock (unlatch) door 104, from the inside, regardless how the door was latched. It could be to reverse the user's own actions of "locking the user in" for safety or security, or it could be a safety matter if another person were to lock the user in from outside using the key.

Figure 14:
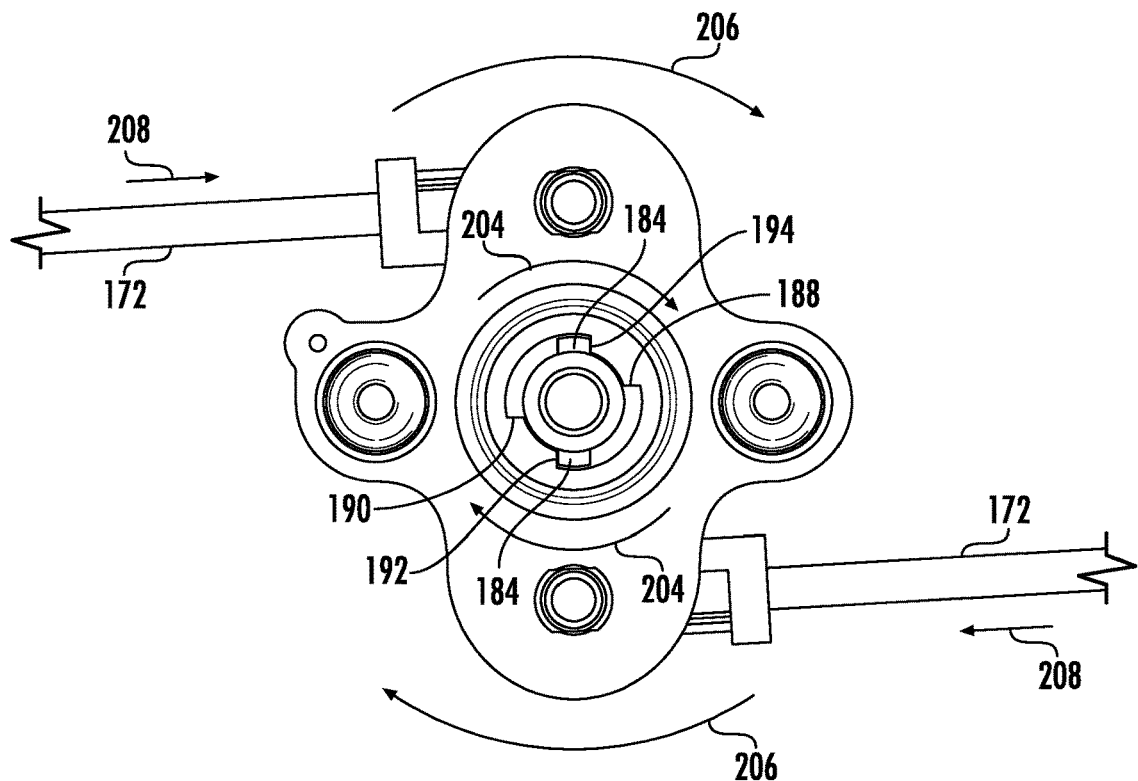
FIG. 14 is a rear, close-up view as in FIG. 11, but with the latch of the latching assembly moved to the unlatched position by inserting the key in the key cylinder and turning the key cylinder in the second direction.
Figure 15:
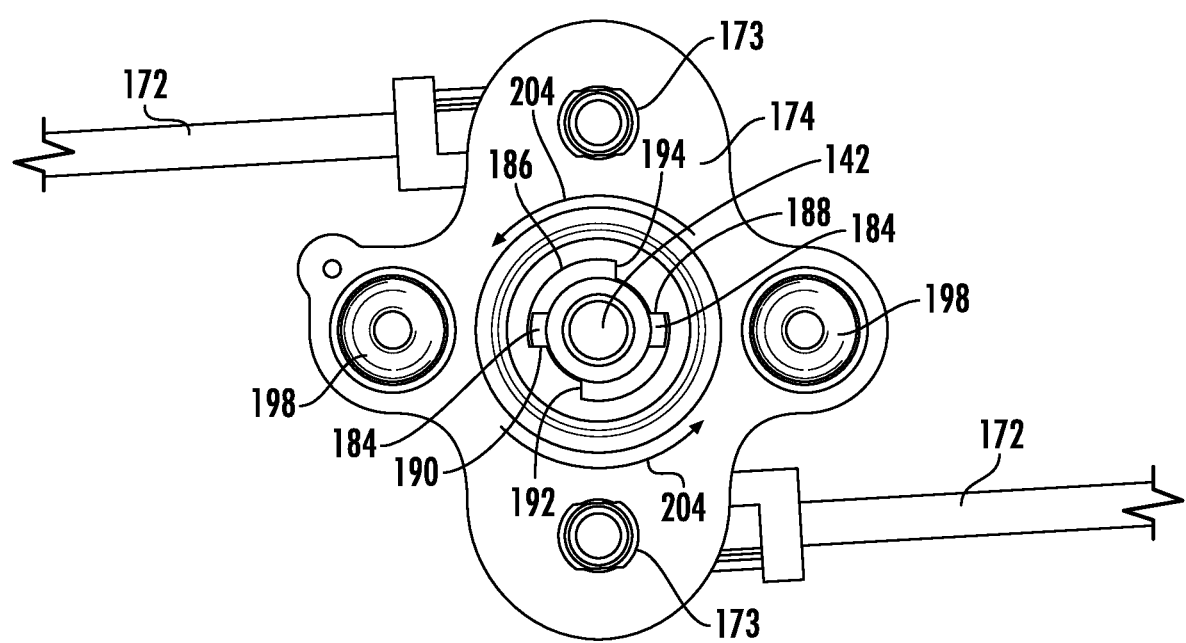
FIG. 15 is a rear, close-up view as in FIG. 14, but with the key removed from the key cylinder after having been turned in the first direction leaving the latch of the latching assembly in the unlatched position.

FIGS. 14 and 15 show use of the key to unlock (unlatch) the door from the outside starting as the latched position of FIG. 11 or 12. In FIG. 14, the user has inserted and rotated the key 90 degrees so that key cylinder 142 and cams 184 (arrows 204), and flange 174 (arrows 206) rotate together, causing rods 172 and latches 170 to retract (arrows 208). Cams 184 cause flange 174 to rotate via contact with second shoulders 192, 194.

In FIG. 15, the key has been turned back 90 degrees (arrows 204) so that the key can be removed from key cylinder 142. Key cylinder 142 and cams 184 rotate 90 degrees. Note that only key cylinder 142 and cams 184 rotate because the size and orientation of opening 186 allows for the lost-motion, lazy cam function. Cams 184 are moved to point of contact with, but not far enough to move, first shoulders 188, 190. Flange 174, rods 172, and latches 170 therefore do not move. The door remains closed and unlocked, and the key can be removed. The orientation of parts in FIG. 15 has thus returned to the original position of FIG. 9.

Figure 5:
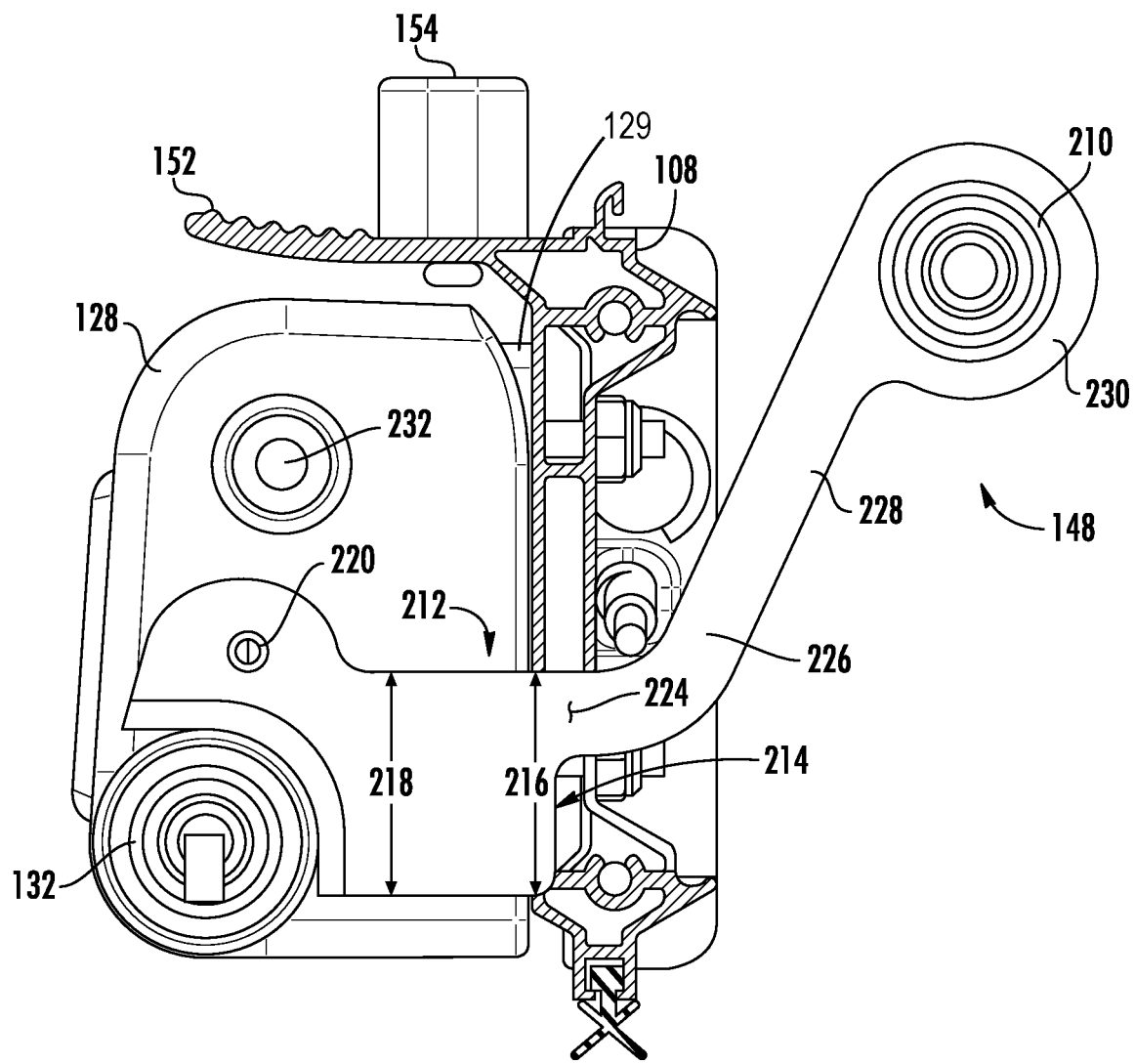
FIG. 5 is a sectional view through the bottom portion of the door with the pivotable handle assembly in the first position of FIG. 2.
Figure 6:
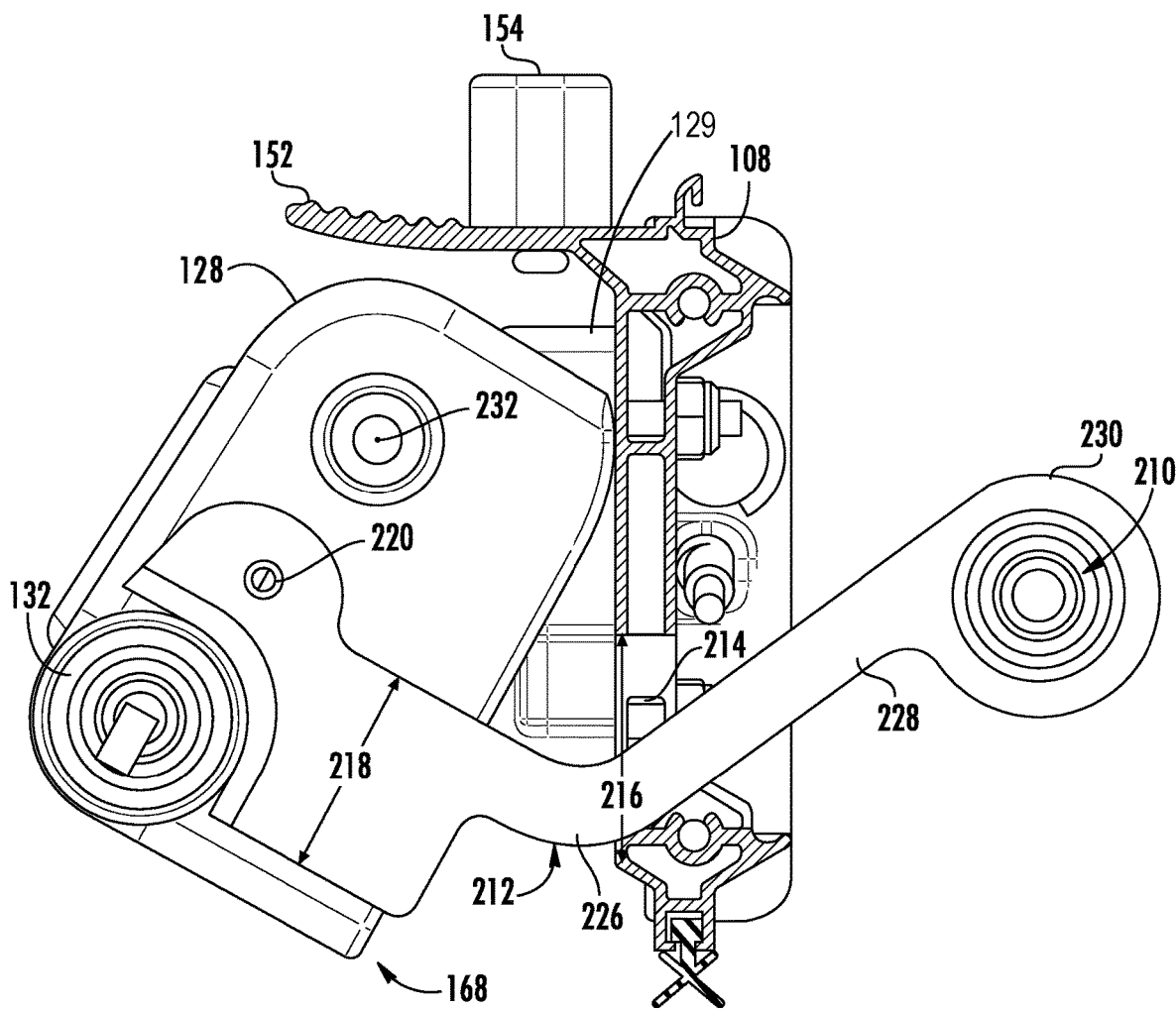
FIG. 6 s a sectional view through the bottom portion of the door with the pivotable handle assembly in the second position of FIG. 3.

Second release mechanism 148 (see FIGS. 4-8) is provided on the inside of door 104 for moving pivotal handle assembly 144 from a first (secured) position (FIG. 5) and a second (released) position (FIG. 6). As noted above, when door 104 is in a closed position and bar 132 is in the first position beneath cavities 166 of retaining elements 164 (also called catches), the retaining elements contact the bar and prevent the door from moving upward toward the opened position. But when door 104 is in a closed position and bar 132 is in the second (pivoted outward) position, the bar is spaced from retaining elements 164, so the door may be moved upward toward the opened position.

Second release mechanism 148 includes a release element 210 attached to bar 132 for moving the bar from the first position to the second positon. The second release element may be any sort of handle, gripping member, etc., such as the illustrated bar, and at least one connecting member 212 extending through an opening 214 in door 104. As shown, release element 210 is a bar, and two connecting members 212 are provided to connect bar 132 and bar 210 through bottom slat 108 so that all move together as one rigid unit.

Connecting members 212 may be attached to bars 132 indirectly, for example via screws 220 that secure the connecting members to pivot blocks 128. Connecting members 212 may be attached to bars 210 in various ways, such as via end cups 220, set screws (not shown), etc.

Connecting elements 212 may have a profile that is complementary to that of opening 214 so that connecting elements provide some sealing of opening 214 when bar is in the first (secured) position and/or to allow connecting elements to smoothly move to the second (pivoted) position while also providing a compact location of bar 210 on the inside of door 104. As shown, opening 214 has a height 216 that corresponds to a height 218 of a blocking portion 224 of connecting elements 212 when in the first (secured) position (FIG. 5). A gasket or lining may also be added at opening 214, if desired to further improve sealing.

As illustrated in FIGS. 5 and 6, on connecting elements 212 to the right of blocking portion 224 is a bend 226, an extending portion 228, and an end 230 at which bar 210 is mounted. Such shape, combined with the location of pivot axis 232 of pivot blocks 128 to which connecting elements 212 are mounted on front side of door 104, provides clearance for the connecting elements to slide unimpeded within openings 214 when moved between the positions of FIGS. 5 and 6.

A user, whether accidentally or intentionally located in compartment 118 with door 104 closed, latched by latching assembly 140 (whether via the latching assembly or key cylinder 142), and secured by bar 110, can thus move the latching assembly 140 and the bar 110 to respective positions that allow the door 104 to be moved upwards and opened. This internal release function is often called an emergency release function in case a user in inadvertently locked into the compartment. However, the present internal release mechanisms also include "non-emergency" re-opening, for example when the user has intentionally chosen to close and secure the compartment from the inside for safety or other reasons. Such latching and unlatching of the latching assembly 140 can occur from the inside and securing of freeing of bar 110, all without use of the key, not just from the outside by using the key and manipulating bar 110. Use of the lazy-cam function assists with the operations described above but is not required in all applications if an alternate type of key cylinder and/or latching assembly were employed.

In view of the above, a multifunction securing mechanism for a compartment securable by a door is disclosed. The mechanism is readily attachable to OEM vehicles on doors such as roll up doors or others, and can also be added as a retrofit to existing vehicles. It should be understood that variations and modifications are possible to the embodiments disclosed above, and that the present invention is not limited to such.

We claim:

1. A multifunction securing mechanism for a compartment closable by a door movable by a user between an opened position and a closed position, the multifunction securing mechanism comprising:
   a latching assembly including a rotatable member and latch connected to the rotatable member and movable between a latching position and an unlatching position, when the door is in the closed position and the latch is in the latching position the latch is positioned to secure the door in the closed position, and when the door is in the closed position and the latch is in the unlatching position the latch is positioned to allow the door to move from the closed position toward the opened position;
   a key cylinder having a key opening on an outside of the door, the key cylinder selectively rotatable in a first direction and a second direction, rotation of the key cylinder in the first direction causing the rotatable member of the latching assembly to move the latch from the unlatching position to the latching position, rotation of the key cylinder in the second direction causing the rotatable member of the latching assembly to move the latch from the latching position to the unlatching position;
   at least one catch located on a surface adjacent the outside of the door;
   a bar pivotally mounted to the outside of the door and movable between a first position and a second position, when the door is in a closed position and the bar is in the first position the catch contacts the bar and prevents the door from moving toward the opened position, and when the door is in a closed position and the bar is in the second position the catch is spaced from the bar and allows the door to move toward the opened position; and
   a first release mechanism located on an interior side of the door, the first release mechanism including a release element operatively attached to the rotatable member of the latching assembly and movable between a rest position and a release position, movement of the release element from the rest position to the release position moving the latch from the latching position to the unlatching position; and
   a second release mechanism located on the interior side of the door, the second release mechanism including a release element attached to the bar for moving the bar from the first position to the second position;
   wherein the first release mechanism includes an extending element attached to the rotatable member of the latching assembly;
   wherein the rotatable member of the latching assembly includes a plate, a first end of the latch being pivotally attached to the plate, the rotatable member defining an opening with a camming profile for selectively rotating with the key cylinder when the plate rotates; and
   wherein the first release mechanism further includes a cover with at least one arcuate guide slot adjacent the rotatable member, the arcuate guide slot directing and defining a rotational extent of movement of the extending element.

2. The multifunction securing mechanism of claim 1, wherein the rotatable assembly includes two of the extending elements and two of the arcuate guide slots, the two extending elements being located on opposite sides of the key cylinder.

3. The multifunction securing mechanism of claim 1, wherein the second release mechanism includes a handle and at least one connecting member extending through the door, the connecting member being fixed to the bar and the handle so that the bar, connecting member and handle move together as one rigid unit.

4. A multifunction securing mechanism for a compartment closable by a door movable by a user between an opened position and a closed position, the multifunction securing mechanism comprising:
 a latching assembly including a rotatable member and latch connected to the rotatable member and movable between a latching position and an unlatching position, when the door is in the closed position and the latch is in the latching position the latch is positioned to secure the door in the closed position, and when the door is in the closed position and the latch is in the unlatching position the latch is positioned to allow the door to move from the closed position toward the opened position;
 a key cylinder having a key opening on an outside of the door, the key cylinder selectively rotatable in a first direction and a second direction, rotation of the key cylinder in the first direction causing the rotatable member of the latching assembly to move the latch from the unlatching position to the latching position, rotation of the key cylinder in the second direction causing the rotatable member of the latching assembly to move the latch from the latching position to the unlatching position;
 at least one catch located on a surface adjacent the outside of the door;
 a bar pivotally mounted to the outside of the door and movable between a first position and a second position, when the door is in a closed position and the bar is in the first position the catch contacts the bar and prevents the door from moving toward the opened position, and when the door is in a closed position and the bar is in the second position the catch is spaced from the bar and allows the door to move toward the opened position; and
 a first release mechanism located on an interior side of the door, the first release mechanism including a release element operatively attached to the rotatable member of the latching assembly and movable between a rest position and a release position, movement of the release element from the rest position to the release position moving the latch from the latching position to the unlatching position; and
 a second release mechanism located on the interior side of the door, the second release mechanism including a release element attached to the bar for moving the bar from the first position to the second position;
 wherein the second release mechanism includes a handle and at least one connecting member extending through the door, the connecting member being fixed to the bar and the handle so that the bar, connecting member and handle move together as one rigid unit; and
 wherein the second release mechanism includes two of the connecting members and the handle includes a second bar.

5. The multifunction securing mechanism of claim 1, including two of the catches, each of the catches being mounted at a respective lateral side of a roll up door.

6. The multifunction securing mechanism of claim 1, wherein the door is a roll up door mounted in two tracks at lateral sides of the roll up door.

7. The multifunction securing mechanism of claim 6, wherein the latch extends into an opening in one of the tracks when the door is in a closed position and the latch is in the latching position.

8. The multifunction securing mechanism of claim 7, wherein the latching assembly includes two of the latches, each of the latches extendable into an opening in a respective one of the tracks when the door is in a closed position and the latches are in the latching position.

9. The multifunction securing mechanism of claim 8, wherein the latches are mounted on rods, wherein the rotatable element includes a flange, each rod being pivotally attached to the flange so as to be movable upon rotation of the key cylinder.

10. A roll up door assembly mountable in two laterally-spaced tracks, the roll up door assembly comprising:
 a door sized to be mountable and slidable along the two, laterally-spaced tracks, the door being a roll up door;
 a latching assembly including a rotatable member and latch connected to the rotatable member and movable between a latching position and an unlatching position, when the door is in the closed position and the latch is in the latching position the latch is positioned to secure the door in the closed position, and when the door is in the closed position and the latch is in the unlatching position the latch is positioned to allow the door to move from the closed position toward the opened position;
 a key cylinder having a key opening on an outside of the door, the key cylinder selectively rotatable in a first direction and a second direction, rotation of the key cylinder in the first direction causing the rotatable member of the latching assembly to move the latch from the unlatching position to the latching position, rotation of the key cylinder in the second direction causing the rotatable member of the latching assembly to move the latch from the latching position to the unlatching position;
 at least one catch located on a surface adjacent the outside of the door;
 a bar pivotally mounted to the outside of the door and movable between a first position and a second position, when the door is in a closed position and the bar is in the first position the catch contacts the bar and prevents the door from moving toward the opened position, and when the door is in a closed position and the bar is in the second position the catch is spaced from the bar and allows the door to move toward the opened position;
 a first release mechanism located on an interior side of the door, the first release mechanism including a release element operatively attached to the rotatable member of the latching assembly and movable between a rest position and a release position, movement of the release element from the rest position to the release position moving the latch from the latching position to the unlatching position; and
 a second release mechanism located on the interior side of the door, the second release mechanism including a release element attached to the bar for moving the bar from the first position to the second position; and
 wherein the first release mechanism includes an extending element attached to the rotatable member of the latching assembly, and wherein the rotatable member of the latching assembly includes a plate, a first end of the latch being pivotally attached to the plate, the rotatable member defining an opening with a camming profile for selectively rotating with the key cylinder when the plate rotates; and wherein the first release mechanism further includes a cover with at least one arcuate guide slot adjacent the rotatable member, the arcuate guide slot directing and defining a rotational extent of movement of the extending element.

11. A multifunction securing mechanism for a compartment closable by a door movable by a user between an opened position and a closed position, the multifunction securing mechanism comprising:

a latching assembly including a rotatable member and latch connected to the rotatable member and movable between a latching position and an unlatching position, when the door is in the closed position and the latch is in the latching position the latch is positioned to secure the door in the closed position, and when the door is in the closed position and the latch is in the unlatching position the latch is positioned to allow the door to move from the closed position toward the opened position;

a key cylinder having a key opening on an outside of the door, the key cylinder selectively rotatable in a first direction and a second direction, rotation of the key cylinder in the first direction causing the rotatable member of the latching assembly to move the latch from the unlatching position to the latching position, rotation of the key cylinder in the second direction causing the rotatable member of the latching assembly to move the latch from the latching position to the unlatching position;

at least one catch located on a surface adjacent the outside of the door;

a bar pivotally mounted to the outside of the door and movable between a first position and a second position, when the door is in a closed position and the bar is in the first position the catch contacts the bar and prevents the door from moving toward the opened position, and when the door is in a closed position and the bar is in the second position the catch is spaced from the bar and allows the door to move toward the opened position; and a first release mechanism located on an interior side of the door, the first release mechanism including a release element operatively attached to the rotatable member of the latching assembly and movable between a rest position and a release position, movement of the release element from the rest position to the release position moving the latch from the latching position to the unlatching position; and a second release mechanism located on the interior side of the door, the second release mechanism including a release element attached to the bar for moving the bar from the first position to the second position;

wherein the second release mechanism includes a handle and at least one connecting member extending through the door, the connecting member being fixed to the bar and the handle so that the bar, connecting member and handle move together as one rigid unit; and wherein the second release mechanism includes two of the connecting members and the handle includes a second bar.

12. The roll up door assembly of claim 10, including two of the catches, each of the catches being mounted at a respective lateral side of a roll up door.

13. The roll up door assembly of claim 10, further including the tracks, wherein the latching assembly includes two of the latches, each of the latches extendable into an opening in a respective one of the tracks when the door is in a closed position and the latches are in the latching position.

14. The roll up door assembly of claim 13, wherein the latches are mounted on rods, each rod being pivotally attached to the rotatable member.

15. A multifunction securing mechanism for a compartment closable by a door movable by a user between an opened position and a closed position, the multifunction securing mechanism comprising:

a key cylinder having a radially extending drive member attached thereto;

a two-point latching assembly including a rotatable member, the drive member rotating the rotatable member during rotation of the key cylinder, the two-point latching assembly including two latches each having a first end attached to the rotatable member and a second end movable between a latching position and an unlatching position, when the door is in the closed position and the latches are in the latching position the latches are positioned to secure the door in the closed position, and when the door is in the closed position and the latches are in the unlatching position the latches are positioned to allow the door to move from the closed position toward the opened position;

an opening in a structure rotatable with the rotatable member defining a lazy cam profile interacting with the drive member;

at least one catch located on a surface adjacent the outside of the door;

a bar pivotally mounted to the outside of the door and movable between a first position and a second position, when the door is in a closed position and the bar is in the first position the catch contacts the bar and prevents the door from moving toward the opened position, and when the door is in a closed position and the bar is in the second position the catch is spaced from the bar and allows the door to move toward the opened position;

a first release mechanism located on an interior side of the door, the first release mechanism including a release element operatively attached to the rotatable member for moving the latches between the latching position and the unlatching position without use of the key cylinder; and a second release mechanism located on the interior side of the door, the second release mechanism including a release element attached to the bar for moving the bar from the first position to the second position;

wherein the first release mechanism includes an extending element attached to the rotatable member of the latching assembly;

wherein the rotatable member of the latching assembly includes a plate, a first end of the latch being pivotally attached to the plate, the rotatable member defining an opening with a camming profile for selectively rotating with the key cylinder when the plate rotates;

wherein the first release mechanism further includes a cover with at least one arcuate guide slot adjacent the rotatable member, the arcuate guide slot directing and defining a rotational extent of movement of the extending element;

wherein the second release mechanism includes a handle and at least one connecting member extending through the door, the connecting member being fixed to the bar and the handle so that the bar, connecting member and handle move together as one rigid unit; and wherein the second release mechanism includes two of the connecting members and the handle includes a second bar.

* * * * *